United States Patent [19]

Vassiliades et al.

[11] 4,138,362
[45] Feb. 6, 1979

[54] FORMATION OF MICROCAPSULES BY INTERFACIAL CROSS-LINKING, MICROCAPSULES PRODUCED, AND MICROCAPSULAR DISPERSION

[75] Inventors: Anthony E. Vassiliades, Deerfield; Cheng H. Chang, Naperville, both of Ill.

[73] Assignee: Champion International Corporation, Stamford, Conn.

[21] Appl. No.: 760,459

[22] Filed: Jan. 18, 1977

Related U.S. Application Data

[63] Continuation-in-part of Ser. No. 561,631, Mar. 24, 1975, abandoned.

[51] Int. Cl.$^2$ ............................................. B01J 13/02
[52] U.S. Cl. ............................ 252/316; 252/62.1 P; 424/32; 424/34; 424/35; 424/36; 424/37; 427/151; 427/153; 428/307; 428/914
[58] Field of Search ............... 252/316; 424/32, 34, 424/35, 36, 37

[56] References Cited

U.S. PATENT DOCUMENTS

| | | | |
|---|---|---|---|
| 2,460,980 | 2/1949 | Fraenkel-Conrat et al. | 260/119 X |
| 3,016,308 | 1/1962 | Macaulay | 428/307 X |
| 3,069,370 | 12/1962 | Jensen et al. | 252/316 |
| 3,137,631 | 6/1964 | Soloway | 424/36 X |
| 3,429,827 | 2/1969 | Ruus | 252/316 |
| 3,432,327 | 3/1969 | Kan et al. | 252/316 X |
| 3,669,899 | 6/1972 | Vassiliades et al. | 252/316 |
| 3,875,074 | 4/1975 | Vassiliades et al. | 252/316 |
| 3,886,085 | 5/1975 | Kiritani et al. | 252/316 |

FOREIGN PATENT DOCUMENTS

771  1/1967  Japan .................................... 252/316

*Primary Examiner*—Richard D. Lovering
*Attorney, Agent, or Firm*—Roylance, Abrams, Berdo & Farley

[57] ABSTRACT

Pressure-rupturable, oil-containing microcapsules are produced by admixing a water-immiscible, oily material containing an oil-soluble, non-polymeric polyfunctional isocyanate cross-linking agent, and an aqueous solution of a polymeric emulsifying agent in the form of a water-soluble polymer containing recurring —NH$_2$ or =NH groups or a water-soluble natural gum containing recurring hydroxy groups. An oil-in-water emulsion is formed containing the isocyanate dispersed in the form of microscopic emulsion droplets in the aqueous continuous phase containing the emulsifying agent, and a solid capsule wall is formed by the cross-linking of the emulsifying agent by the isocyanate. Emulsions utilizing the natural polymeric emulsifying agents preferably contain a viscosity lowering agent in the form of a urea-formaldehyde or alkali metal periodate in order to obtain a higher solids coat weight while at an efficient coating viscosity.

38 Claims, No Drawings

FORMATION OF MICROCAPSULES BY INTERFACIAL CROSS-LINKING, MICROCAPSULES PRODUCED, AND MICROCAPSULAR DISPERSION

This is a continuation-in-part application of U.S. patent application Ser. No. 561,631 in the name of A. E. Vassiliades and C. H. Chang filed Mar. 24, 1975, and now abandoned.

This invention relates to a microencapsulation system. More particularly, this invention relates to a process for the encapsulation of minute oil droplets and to the microcapsules produced thereby, and to pressure-responsive, transfer-copy systems employing such microcapsules, wherein the microcapsules have excellent thermal stability and friability.

Microcapsules containing solid, liquid and gaseous nucleus materials have been commercially utilized in various applications. One of the most widespread uses of such microcapsules has been in the art of pressure-sensitive copy systems wherein minute droplets of an oily meterial containing a chromogenic compound are encapsulated and coated onto a transfer sheet. Upon rupture of the microcapsules under localized pressure, the chromogen is transferred by means of the oily vehicle to an underlying copy sheet having an absorbent coating of a Lewis acid material which reacts with the chromogen to produce a visible colored image at points corresponding to where the microcapsules have been ruptured and the chromogen transferred.

Various processes have been proposed for producing the microcapsules involving both chemical and physical phenomena. For example, one system involves a phenomenon known as "complex coacervation," wherein two oppositely charged colloids, such as gelatin and gum arabic, are utilized under carefully controlled conditions of pH and temperature to form a liquid wall around dispersed oil droplets containing a chromogen, and the liquid wall is subsequently hardened by physical and/or chemical action.

Another proposal involves the formation of microcapsules wherein a polyvalent polyisocyanate and a coreactant material, such as an epoxy compound, an acid anhydride compound, compounds having hydroxyl groups, thiol groups, amino groups, or carboxylic acid groups are both dissolved in the oily phase and coreact to form a microcapsule wall from the inside of the oil droplets. Additionally, a protective colloid, such a gelatin, gum arabic, casein or the like, or a surfactant, such as an alkyl benzene sulfonate or the like, is employed in order to effectively emulsify the oily liquid into a polar liquid and thereby form an emulsion.

It has now been found that pressure-rupturable, oil-containing microcapsules having excellent thermal stability and friability may be provided by a system that avoids the somewhat complex process controls and multitude of ingredients normally required by previously proposed systems. According to the present invention, a process for forming microcapsules merely involves admixing a water-immiscible oily material containing an oil-soluble, non-polymeric cross-linking agent in the form of a polyfunctional isocyanate and an aqueous solution of a water-soluble, polymeric emulsifying agent, which may be a natural or synthetic water-soluble nitrogen-containing polymer containing recurring $-NH_2$ or $=NH$ groups, or a natural gum containing recurring hydroxy groups. The oily material and the aqueous solution are admixed under conditions that are effective to form an oil-in-water emulsion wherein the oily material containing the polyfunctional isocyanate is dispersed in the form of microscopic emulsion droplets in the aqueous continuous phase containing the emulsifying agent, which surrounds each of the droplets and is cross-linked by the isocyanate to form a solid, cross-linked capsule wall.

Preferably, a viscosity lowering agent is included in the emulsion when natural polymeric emulsifying agents are utilized in order to provide a microcapsular dispersion having a lower viscosity while having a relatively high solids content. It is vital from a commercial viewpoint to provide a microcapsular dispersion having as high a solids content as possible for coating purposes; however, at the same time it is necessary that the dispersion have a low enough viscosity to permit it to be coated onto a substrate, such as paper, in the case of carbonless copy paper production.

The use of the viscosity lowering agents of the present invention enables one to include up to twice the solids in the coating dispersion without concurrently increasing the viscosity. Thus, the process of the present invention greatly improves the economics of the system, since greater coating speeds are attainable with the higher solids content and lower viscosity of the present dispersions. Likewise, greater drying efficiencies are attainable, since there is less water to remove. Also, less drying time is required to dry the same amount of product.

Unlike previously proposed systems, the process of the present invention does not require a separate coreactant for the isocyanate and a separate protective colloid or surfactant in order to form the emulsion, but the microcapsular wall or shell is formed directly by the interaction between the polyisocyanate cross-linking agent and the emulsifying agent which may be, if desired, the sole coreactant for the isocyanate.

Thus, according to another embodiment of the present invention, the capsule walls are formed by the interaction of a polyfunctional isocyanate cross-linking agent and a natural, water-soluble polymer containing recurring $-NH_2$ or $=NH$ groups, such as a gelatin, which polymer plays a dual role and serves to aid in the emulsification of the oily droplets while simultaneously forming the capsule walls.

According to still another emobdiment of the present invention, microcapsules are formed by the cross-linking of a natural gum containing recurring hydroxy groups, such as gum tragacanth by the action of the polyisocyanate, and the gum tragacanth likewise plays a dual role in the emulsification of the oil droplets and the formation of the capsule walls.

Suitable oil-soluble polyfunctional isocyanates that may be employed in the process of the present invention include, for example, diisocyanates, such as 2,6-toluenediisocyanate; 2,4-toluenediisocyanate; 4,4'-diphenylmethanediisocyante; 1,4-naphthyldiisocyanate; hexamethylenediisocyanate; 1,4-cyclohexyldiisocyanate, and the like; triisocyanates, such as 4,4',4''-triphenylmethanetriisocyanate; 2,4,6-toluenetriisocyanate, and the like; and isocyanate adducts, such as an adduct of hexamethylenediisocyanate with hexanetriol, an adduct of toluenediisocyanate with trimethylol propane, and the like.

As previously mentioned, the wall-forming polymeric emulsifying agent of the present invention may be either a natural or synthetic polymer containing recurring —NH2 or =NH groups, or a polyhydroxy group-containing natural gum. Suitable natural nitrogen-containing polymers include proteinaceous, hydrophilic materials, such as gelatin, albumins, casein, chitin, chitosan, or the like —$NH_2$ or =NH group-containing natural polymers.

Suitable synthetic hydrophilic polymers containing recurring —$NH_2$ or =NH groups include polymeric amines, such as poly(ethyleneimine), and the like; polyamides, such as water-soluble polyacrylamide; water-soluble copolymers of acrylamide and N-mono-alkylacrylamide, wherein alkyl groups have 1–10 carbon atoms, e.g., methyl, ethyl, isopropyl, tertiary butyl, octyl, etc.; amino-aldehyde resins, such as melamine-formaldehyde prepolymers, and the like; ureaaldehyde prepolymers, such as urea-formaldehyde prepolymer, and the like. The urea-formaldehyde prepolymer is prepared by reacting urea and formaldehyde in the molar ratio of about 1 mole of urea to about 1.2 to 2.5 moles of formaldehyde, preferably about 1.2 to 1.5. The reaction is usually carried out in an alkaline aqueous medium to give water soluble methylol urea derivatives such as mono- and dimethylol urea. Thus, any water-soluble polymer, either natural or synthetic, which contains recurring —$NH_2$ or =NH groups and will therefore react with the polyfunctional isocyanate to form cross-linked capsule walls is suitable for use in the present invention.

Suitable natural polyhydroxyl gums which may serve as both the emulsifying agent and the wall-forming material include water-soluble polyhydroxy-containing gum arabic, gum tragacanth, guar gum, carrageenan, and the like. Similarly, any water-soluble, natural gum that contains recurring hydroxy groups, and will thus become cross-linked by the polyisocyanate to form cross-linked capsule walls is suitable for use in the process of the present invention.

As previously indicated, a viscosity-lowering agent is included in the capsule-forming emulsion in order to provide a high solids content-lower viscosity microcapsular dispersion for coating purposes. Suitable viscosity-lowering agents include: alkali metal periodates, such as sodium or potassium periodate; or urea-aldehyde prepolymers, such as urea-formaldehyde prepolymer.

Suitable amounts of the viscosity-lowering agent include, for example, between about 0.1 and about 5 percent by weight, preferably between about 0.5 and about 1.0 percent by weight of the alkali metal periodate based upon the dry weight of the emulsifying agent. Similarly, between about 10 and about 40 percent, preferably between about 25 and about 35 percent by weight of the urea-formaldehyde prepolymer based upon the dry weight of the emulsifying agent may be used, for example.

Thus, for example, a sodium periodate viscosity-lowering agent may be included in the aqueous solution of a chitosan emulsifying agent in amounts, for example, of between 0.5 to 1.0 percent by weight based upon the dry weight of the chitosan.

Likewise, a water-soluble, urea-aldehyde prepolymer viscosity-lowering agent may be used in combination with a water-soluble polymeric emulsifier containing recurring —NH— groups, such as gelatin, chitosan or the like, (for example, a water-soluble, urea-formaldehyde prepolymer in combination with gelatin or a water-soluble, urea-formaldehyde prepolymer in combination with chitosan) to provide a microcapsular dispersion having an extremely low viscosity compared to other known systems at the same solids content. Moreover, the urea-aldehyde prepolymer functions as an emulsifying agent and a wall-former as well as a viscosity-lowering agent in such systems.

Suitable "water immiscible oily materials" include hydrophobic liquids which have been conventionally utilized in copy systems as the solvent for the chromogen. Suitable materials include isopropyl naphthalenes, isopropyl biphenyls, ethyldiphenyl methanes, dimethyldiphenyl ethanes, dimethyl phthalate, dioctyl phthalate, tributyl phosphate, or tricresyl phosphate and the like. The viscosity of the oil medium is a determining factor in the speed with which the markings may be transferred to the copy sheet, since low viscosity oily materials will transfer more quickly than oily materials of a higher viscosity. The vapor pressure should be sufficiently low to avoid substantial losses of the oily material through evaporation during the encapsulation system. Additional oily materials which may be employed include the aliphatic and aromatic hydrocarbon oils, such as kerosene, mineral spirits, naphtha, xylene, toluene, and the like.

The ratio of polymeric emulsifying agent that is provided to the emulsion is at least one part by weight of emulsifying agent per part of cross-linking agent. Thus, suitable ratios of emulsifier to cross-linking agent include between 1 and 40 parts by weight of emulsifying agent per part of cross-linking agent, preferably between 2 and 10 parts by weight of emulsifying agent per part of cross-linking agent.

Emulsification may be conducted at any suitable temperature. For example, temperatures in the range of between ambient temperature up to 100° C. may be utilized, although temperatures outside this range may also be employed. Subsequent to or concurrently with emulsification, the microcapsular dispersion may be heated to a temperature in the range of between 25° C. and 100° C., preferably between 50° C. and 70° C. for a period of between 1 and 24 hours, preferably between 1 and 4 hours in order to effect the cross-linking of the emulsifying agent by the polyfunctional isocyanate agent. The cross-linking reaction may be conducted at ambient temperatures; however, longer periods of time, for example, 24 hours, are required. The solids content of the resulting emulsion is preferably between 20 and 51 percent by weight, for example.

According to another aspect of the present invention, a second cross-linking agent for the polymeric emulsifying agent may be added to the microcapsular dispersion after formation of the solid, cross-linked walls by the primary reaction of the polyfunctional isocyanate and the emulsifying agent. Thus, for example, in the case of proteinaceous polymers, such as gelatin, an additional cross-linking agent, such as an aldehyde, e.g., formaldehyde, glyoxal, etc., or a compound releasing in aldehyde, e.g. formaldehyde, under prevailing conditions, may be added to the dispersion by means of the aqueous, continuous phase. This embodiment of the invention is desirable in order to impart increased stability to the capsule wall and insolublize any excess biodegradable polymer. Suitable amounts of the "secondary cross-linking agent" include between 10 and 30 parts by weight of emulsifier per part by weight of the second cross-linking agent.

With the scope of the present invention, the herein-disclosed process may be used to encapsulate an oil alone, or alternatively, the oil may serve merely as a vehicle for carrying another active ingredient or material. In this latter utility, the active material may be dissolved, dispersed or suspended in the oily material. The processes of this invention can, therefore, be used to encapsulate medicines, poisons, foods, cosmetics, adhesives or any other material which finds utility in microcapsular form.

In the preferred utility of this invention, viz., transfer sheet record material, the process may be used to encapsulate an oily printing ink, which may be used in smudge-proof typewriter ribbons or carbon papers. In such a use, it has been found expedient to encapsulate a colorless, water-insoluble dye intermediate dissolved in the oil. Colorless dye intermediates are wholly conventional in such utilities and are well known in the art. Exemplary of the colorless dye intermediates which have been contemplated for use in this invention are leuco dyes, such as crystal violet lactone, and derivatives of bis(p-dialkylaminoaryl)-methane such as disclosed in U.S. Pat. Nos. 2,981,733 and 2,981,783. These dye intermediates are colorless in an alkaline or neutral medium and react to form a visible color in an acidic medium. Thus, when a capsule containing such a compound is ruptured and the compound is discharged onto an adsorbent, acidic electron-acceptor material, such as a paper web coated with an organic or an inorganic acid material, a visible color appears on the adsorbent material at the point of contact.

The leuco dye intermediates which are mentioned above are, in general, oil-soluble. Oils which are inert with respect to the dye and in which the dye has appreciable solubility, e.g., above 1.0 gram of dye per 100 grams of oil, are preferable.

Microcapsules having diameters ranging from 0.1 to several hundred microns may be produced by the process of the present invention. However, it is preferred to form oily droplets containing the polyisocyanate in emulsion form wherein the droplets have a particle size of between 1 and 10 microns prior to curing. An especially preferred range is between 4 and 6 microns in the case of microcapsules to be used for transfer copy systems.

According to a preferred embodiment of the present invention, a pigment, such as carbon black, is dispersed in the oily droplets, rather than a chromogen. The resulting capsules are coated onto paper to provide a copy sheet which produces a black image on an underlying copy sheet upon rupture of the capsules. Such products have significant advantages over conventional carbon paper products in that they minimize smudging during handling. Moreover, such microcapsules containing, for example, carbon black particles may be incorporated into plastics, plastic films, rubber, etc. to improve the stability of the substrate towards ultra-violet light and thereby avoid deterioration of the physical and mechanical properties. Moreover, such capsules may be used in conventional printing methods, such as Xerography, for elimination of the less desirable liquid toners.

The emulsion containing the microcapsules may be either coated directly onto a web material and dried or the microcapsules may be separated from the emulsion by some physical means such as filtration or centrification; washed, if desired, redispersed in a solution of a binder; coated onto a web material and dried. Suitable binders include methyl cellulose, starch, casein, polyvinyl alcohol, polyvinyl acetate latex, and styrene-butadiene latex. Alternatively, materials such as urea-formaldehyde or melamine-formadehyde condensates may be employed.

The microencapsulated oils of this invention are suitable for use in the manufacture of transfer sheet record material. More specifically, capsules containing a leuco dye intermediate in the oil are to be coated onto one side of a web material and dried. The coating operation is performed by conventional means, such as by use of an air knife. The capsule coatings are dried at temperatures ranging from 40 to 100° C. At these temperatures, no appreciable degradation of the capsules and, in particular, the leuco dye intermediate, takes place.

The web material commonly used in transfer sheet record material is paper and is, therefore, preferable in the practice of this invention. However, the microcapsules produced by the herein-disclosed processes are also capable of being coated onto other materials such as plastic and fabric or textile webs. When using a web material having a high degree of porosity, it is advisable to pre-coat the web with a material which will reduce seepage of the microcapsular coating through the web. Impregnating the web material with polyvinyl alcohol or a butadiene-styrene latex is the conventional practice for producing an essentially impervious substrate.

Transfer sheets made according to the various embodiments of this invention have a pleasant appearance and are almost smudge-proof when brought into face-to-face contact with a copy sheet containing a coating of an adsorbent electron-acceptor material. In addition, they show a marked improvement over the transfer sheets presently available in commerce. It has been found that coated paper comprising microcapsules which contain a leuco dye intermediate dissolved in the oil and which microcapsules are formed by the process of this invention are extremely stable.

The following examples illustrate the best modes contemplated for carrying out this invention. All percentages are by weight unless otherwise specified.

EXAMPLE 1

Three thousand three hundred grams of 37 percent formaldehyde and 900 grams of deionized water are mixed thoroughly in a flask. The pH of the solution is adjusted to 9.0 with sodium hydroxide. After the addition of 1,790 grams of urea and 10 grams of melamine, the resulting solution is heated at 65° C. for one hour to provide a water-soluble urea-formaldehyde prepolymer having a solids content of 50.3 percent by weight.

A solution of 126 grams of crystal violet lactone, 108 grams of benzoyl leucomethylene blue, 240 grams of dimethylphthalate, 360 grams of an adduct of toluene diisocyanate with trimethylol propane in 5,490 grams of an isopropyl naphthalene solvent is emulsified into a mixed solution of 6,300 grams of 10 percent technical gelatin (No. 164 gelatin available from Hudson Industries Corporation, West Orange, New Jersey) and 540 grams of the water-soluble urea-formaldehyde prepolymer, a viscosity lowering agent, at 50° C.

The resulting dispersion has an average particle size of about 5 microns and is diluted with 10,668 grams of water and cured at 60° C. for about 2 hours. The viscosity of the cured emulsion is only 10 cps at 20° C. at 30 percent total solids.

EXAMPLE 2

A dye solution consisting of 73.6 grams of crystal violet lactone, 63 grams of benzoyl leucomethylene blue, 210 grams of the isocyanate of Example 1 in 3,340 grams of isopropyl naphthalenes is emulsified into a mixture of 525 grams of water-soluble urea-formaldehyde prepolymer and 1,750 grams of 15 percent aqueous technical gelatin (No. 80 available from Hudson Industries Corporation at 45° C. The average particle size is about 5 microns in diameter. The emulsion is diluted with 7,900 grams of water and cured at 60° C. for 3 hours. The final viscosity is 10 cps at 20° C.

EXAMPLE 3

A solution of 2.1 grams of crystal violet lactone, 1.8 grams of benzoyl leucomethylene blue in 91.5 grams of isopropyl naphthalenes is admixed with 6 grams of the isocyanate adduct of Example 2 and 2 grams of tributyl phosphate. The solution is emulsified at ambient temperature into 660 grams of a 2.3 percent chitosan solution containing 0.15 gram of sodium periodate until a particle size of about 5 microns is obtained. The emulsion is then heated at 60° C. for about 2 hours to complete the microencapsulation. The resulting low viscosity (40 cps at 20° C.) dispersion may be readily coated by conventional paper coating methods.

EXAMPLE 4

A polymer solution is prepared by mixing 350 grams of a 3 percent chitosan solution, with a viscosity-lowering agent solution comprising 84 grams of water-soluble ureaformaldehyde prepolymer, and one ml. of a 10 percent sodium periodate. A dye solution of 7.4 grams of crystal violet lactone, 6.3 grams of benzoyl leucomethylene blue, 7 grams of tributyl phosphate, and 21 grams of the isocyanate of Example 3 in 320 grams of isopropyl naphthalenes is emulsified into the polymer solution until the size of oil droplets is about 5 microns.

The emulsion is cured at 55° C. for about 3 hours. The resulting microcapsular dispersion may be readily coated by conventional methods.

EXAMPLE 5

Six hundred-sixty grams of a 2.3 percent by weight aqueous solution of chitosan (a deacetylated chitin available from Kypro Company) are placed in a Waring blender. Forty-eight grams of isopropyl naphthalenes solution containing 2.1 percent by weight crystal violet lactone, 0.9 percent by weight benzoyl leucomethylene blue, and 6 percent by weight of an adduct of toluene diisocyanate with trimethyol propane, are emulsified into the chitosan solution until a particle size of about 5 microns is obtained. The viscosity is about 3000 cps at 20° C. as compared with the 40 cps viscosity at 20° C. for the emulsion of Example 3. The emulsion is then heated under mild agitation at 60° C. for 2 hours.

Upon cooling to room temperature, the microcapsules are coated onto a paper substrate which is superimposed onto a clay-coated paper. Localized pressure is applied with a ballpoint pen to obtain distinct color marks.

EXAMPLE 6

The procedure of Example 5 is repeated with the exception that after curing the emulsion, 5 grams of 37 percent aqueous formaldehyde are added to the microcapsular emulsion. The resulting emulsion is then coated onto the paper to provide a transfer copy sheet.

EXAMPLE 7

Into a solution of 15 grams of gum arabic in 135 grams water is emulsified a solution of 100 grams of an alkylated, partially hydrogenated naphthalene oil containing 2.1 grams or crystal violet lactone, 0.9 grams of benzoyl leucomethylene blue, and 4 grams of toluene diisocyanate. Agitation is continued until a particle size of about 5 microns in diameter is obtained. The emulsion is heated under mild stirring at about 60° C. for 2 hours. It is then coated on a paper to provide a pressure-rupturable transfer sheet.

EXAMPLE 8

The procedure of Example 7 is repeated, except that instead of toluene diisocyanate, an adduct of toluene diisocyanate with trimethylol propane is used. The microcapsules are coated onto a paper.

EXAMPLE 9

A solution of 2.1 grams of crystal violet lactone and 0.9 grams benzoyl leucomethylene blue in 91.5 grams of an alkylated, partially hydrogenated naphthalene oil is dissolved 6 grams of an adduct of toluene diisocyanate with trimethylol propane. The solution is emulsified into 187 grams of 8 percent gelatin (Swift 710) aqueous solution at about 45° C. until a particle size of about 5 microns is obtained. The emulsion is heated at 60° C. for 2 hours under agitation. The viscosity is about 700 cps at 20° C. as compared with 10 cps at 20° C. for the emulsion of Example 1. The microcapsular emulsion is coated onto a paper and dried in an oven.

EXAMPLE 10

The same procedure as in Example 9 is repeated except that 14 grams of 37 percent formaldehyde solution are added after curing the emulsion. The excess gelatin in the continuous phase is then insolubilized.

EXAMPLE 11

In a mixture of 40 grams of tricresyl phosphate and 10 grams of tributyl phosphate is dispersed 25 grams of carbon black (Continex F-1, Whitco Chemical Company). Then, 5 grams of an adduct of toluene diisocyanate with trimethylol propane is added and well stirred in this dispersion. The resulting mixture is emulsified into 250 grams of a 3 percent by weight aqueous solution of chitosan in a Waring blender. Emulsification is continued until the average particle diameter of the droplets is about 5 microns. The microcapsular emulsion is cured at 60° C. for 2 hours. The microcapsules are then coated onto a paper to provide a transfer copy sheet which produces a black image on paper upon rupturing the capsules.

EXAMPLE 12

Six grams of an adduct of toluene diisocyanate with trimethylol propane and 2 grams of tributyl phosphate are added to 100 grams of isopropyl naphthalenes. This solution is emulsified into a dispersion of 20 grams of carbon black (Mogul L, Cabot Corporation) in 500 grams of a 3 percent by weight aqueous solution of chitosan. Agitation is continued until the average particle diameter is about 20 microns. The emulsion is then cured at 60° C. for 2 hours. Microscopic examination shows that carbon black is incorporated in the capsule wall.

EXAMPLE 13

A solution of 2.1 grams of crystal violet lactone and 0.9 grams of benzoyl leucomethylene blue in 91.5 grams of an alkylated, partially hydrogenated naphthalene oil is dissolved in 6 grams of an adduct of toluene diisocyanate with trimethylolpropane. The solution is emulsified into a mixture of 60 grams of 10 percent gelatin and 129 grams of 7 percent polyvinyl alcohol (Vinol 540, 87–89 percent hydrolysis, Air Products and Chemicals) at pH 3 until a particle size of 5 microns is attained. The emulsion is heated at 60° C. for 2 hours under mild agitation, and subsequently 2.9 grams of a 37 percent formaldehyde solution is added. After adjusting the pH of the emulsion to about 5 with a 2 percent sodium hydroxide solution, the microcapsular emulsion is coated onto paper to provide a pressure-sensitive transfer sheet.

EXAMPLE 14

A solution of 2.1 grams of crystal violet lactone and 0.9 grams of benzoyl leucomethylene blue in 91.5 grams of propylated naphthalene is dissolved into an adduct of toluene diisocyanate and trimethylolpropane. The solution is emulsified into a solution of 30 grams of urea-formaldehyde resin (RP 703–78 Casco-Resin, Borden Chemical Company) in 120 grams of water until an average particle size of 5 microns is obtained. The emulsion is cured at 60° C. for 2 hours while under agitation to complete the microencapsulation. Seventy grams of a 7 percent polyvinyl alcohol solution (Vinol 540, 87–89 percent hydrolysis, Air Products and Chemicals) is added to the emulsion.

What is claimed is:

1. A process for the production of pressure-rupturable, oil-containing microcapsules, which comprises admixing:
   (A) a water-immiscible, oily material containing an oil-soluble, non-polymeric cross-linking agent, said cross-linking agent consisting essentially of a polyfunctional isocyanate; and
   (B) an aqueous solution comprising a viscosity-lowering agent and a polymeric emulsifying agent, said viscosity-lowering agent being selected from the group consisting of an alkali metal periodate, a water soluble urea-aldehyde prepolymer and mixtures thereof, said emulsifying agent being selected from the group consisting of water-soluble natural polymers containing recurring —NH$_2$ of =NH groups, and water-soluble natural gums containing recurring hydroxy groups,
said admixing being conducted under conditions effective to form an oil-in-water emulsion, wherein said oily material containing said polyfunctional isocyanate is dispersed in the form of microscopic emulsion droplets in an aqueous, continuous phase, containing said emulsifying agent, and thereby surrounding each of said droplets with a solid cross-linked capsule wall formed by the cross-linking of said emulsifying agent by said polyfunctional isocyanate.

2. The process of claim 1 wherein said viscosity lower agent is an alkali metal periodate.

3. The process of claim 1 wherein said viscosity lowering agent is a water soluble urea-aldehyde prepolymer.

4. The process of claim 1 wherein said emulsifying agent is a natural polymer containing recurring —NH$_2$ or =NH groups.

5. The process of claim 4 wherein said polymeric emulsifying agent is gelatin, casein, chitin or chitosan.

6. The process of claim 5 wherein said emulsifying agent is chitosan.

7. The process of claim 5 wherein said emulsifying agent is gelatin.

8. The process of claim 6 wherein said viscosity lowering agent is an alkli metal periodate.

9. The process of claim 7 wherein said viscosity lowering agent is a water soluble urea-aldehyde prepolymer.

10. The process of claim 1 wherein said polymeric emulsifying agent is a water-soluble natural gum containing recurring hydroxy groups.

11. The process of claim 10 wherein said gum is gum arabic, gum tragacanth, or guar gum.

12. The process of claim 11 wherein said gum is gum arabic.

13. The process of claim 1 wherein said emulsifying agent is a synthetic polymer containing recurring —NH$_2$ or =NH groups.

14. The process of claim 13 wherein said emulsifying agent is urea-formaldehyde or melamine-formaldehyde prepolymer.

15. The process of claim 14 wherein said emulsifying agent is urea-formaldehyde.

16. The process of claim 11 wherein said viscosity lowering agent is an alkali metal periodate or a urea-aldehyde prepolymer.

17. The process of claim 16 wherein said viscosity lowering agent is an alkali metal periodate.

18. A microcapsular dispersion produced according to the process of claim 1.

19. Microcapsules produced by the process of claim 1.

20. Microcapsules produced by the process of claim 3.

21. Microcapsules produced by the process of claim 6.

22. Microcapsules produced by the process of claim 7.

23. The process of claim 1 wherein said oily material additionally contains a chromogenic compound capable of reacting with a Lewis acid.

24. The process of claim 1 wherein said oily material additionally contains carbon black.

25. The process of claim 1 wherein said aqueous solution additionally contains carbon black.

26. The process of claim 1 wherein said polyfunctional isocyanate comprises an isocyanate adduct selected from the group consisting of hexamethylenediisocyanate the hexanetriol, and toluene diisocyanate and trimethylol propane.

27. The process of claim 1 wherein said polyisocyanate is, toluene diisocyanate.

28. The process of claim 1 wherein a mixture of an alkali metal periodate and a water soluble urea-formaldehyde polymer is used.

29. A process for the production of pressure-rupturable, oil-containing microcapsules, which comprises admixing:
   (A) a water-immiscible, oily material containing an oil-soluble, non-polymeric cross-linking agent, said cross-linking agent consisting essentially of a polyfunctional isocyanate; and
   (B) an aqueous solution of a polymeric emulsifying agent, said emulsifying agent being chitin or chitosan,
said admixing being conducted under conditions effective to form an oil-in-water emulsion, wherein said oily material containing said polyfunctional isocyanate is dispersed in the form of microscopic emulsion droplets with a solid, cross-linked capsule wall formed by the cross-linking of said emulsifying agent by said polyfunctional isocyanate, said polymeric emulsifying agent being the sole coreactant for said polyfunctional isocyanate.

30. The process of claim 29 wherein said emulsifying agent is chitosan.

31. Microcapsules produced by the process of claim 29.

32. Microcapsules produced by the process of claim 30.

33. The process of claim 29 wherein said polyfunctional isocyanate comprises an isocyanate adduct selected from the group consisting of hexamethylenediisocyanate and hexanetriol, and toluene diisocyanate and trimethylol propane.

34. The process of claim 29 wherein said polyisocyanate is toluene diisocyanate.

35. A process for the production of pressure-rupturable, oil-containing microcapsules, which comprises admixing:

(A) a water-immiscible, oily material containing an oil-soluble, non-polymeric cross-linking agent, said cross-linking agent consisting essentially of a polyfunctional isocyanate; and (B) an aqueous solution of a polymeric emulsifying agent, said emusifying agent being a water soluble synthetic polymer containing recurring —NH$_2$ or =NH groups, said admixing being conducted under conditions effective to form an oil-in-water emulsion, wherein said oily material containing said polyfunctional isocyanate is dispersed in the form of microscopic emulsion droplets with a solid, cross-linked capsule wall formed by the cross-linking of said emulsifying agent by said poly-functional isocyanate, said polymeric emulsifying agent being the sole coreactant for said polyfunctional isocyanate.

36. The process of claim 35 wherein said emulsifying agent is urea-formaldehyde or melamine-formaldehyde prepolymer.

37. The process of claim 36 wherein said emulsifying agent is urea-formaldehyde.

38. Microcapsules produced by the process of claim 37.

* * * * *